United States Patent
Whitesell et al.

(10) Patent No.: US 8,331,931 B2
(45) Date of Patent: Dec. 11, 2012

(54) SYSTEM AND METHOD FOR CORDLESS HANDSET REGISTRATION

(75) Inventors: Stephen R. Whitesell, Howell, NJ (US); Holger Janssen, Richmond (CA)

(73) Assignee: VTech Telecommunications Limited, Hong Kong (HK)

( * ) Notice: Subject to any disclaimer, the term of this patent is extended or adjusted under 35 U.S.C. 154(b) by 862 days.

(21) Appl. No.: 11/605,338

(22) Filed: Nov. 29, 2006

(65) Prior Publication Data

US 2007/0123256 A1    May 31, 2007

Related U.S. Application Data

(60) Provisional application No. 60/740,646, filed on Nov. 30, 2005.

(51) Int. Cl.
*H04Q 5/02* (2006.01)

(52) U.S. Cl. .............. 455/435.1; 455/426.1; 455/418; 455/419; 455/462

(58) Field of Classification Search .............. 455/435.1, 455/426.1, 418, 419, 462
See application file for complete search history.

(56) References Cited

U.S. PATENT DOCUMENTS

| | | | |
|---|---|---|---|
| 4,593,155 A | 6/1986 | Hawkins | |
| 4,636,741 A | 1/1987 | Mitzlaff | |
| 5,012,234 A | 4/1991 | Dulaney et al. | |
| 5,353,341 A * | 10/1994 | Gillis et al. | 455/464 |
| 5,463,659 A * | 10/1995 | Nealon et al. | 375/133 |
| 5,675,629 A * | 10/1997 | Raffel et al. | 455/552.1 |
| 5,765,111 A * | 6/1998 | Kim | 455/462 |
| 5,991,624 A * | 11/1999 | Ishida et al. | 455/435.1 |
| 6,029,074 A * | 2/2000 | Irvin | 455/571 |
| 6,148,205 A * | 11/2000 | Cotton | 455/435.1 |
| 6,304,756 B1 * | 10/2001 | Hebeler et al. | 455/450 |
| 6,445,911 B1 * | 9/2002 | Chow et al. | 455/406 |
| 6,704,575 B1 * | 3/2004 | Fujita | 455/462 |
| 6,832,082 B1 * | 12/2004 | Ramaswamy et al. | 455/411 |
| 2002/0061748 A1 * | 5/2002 | Nakakita et al. | 455/435 |
| 2002/0102999 A1 * | 8/2002 | Maggenti et al. | 455/518 |
| 2003/0216146 A1 * | 11/2003 | Otsuka | 455/462 |
| 2004/0152482 A1 | 8/2004 | Raffel et al. | |

(Continued)

FOREIGN PATENT DOCUMENTS

DE    4207776    9/1993

(Continued)

OTHER PUBLICATIONS

Uniden TCX 805 Accessory Handset Owner's Manual, 2005.

(Continued)

*Primary Examiner* — Dwayne Bost
*Assistant Examiner* — William F Rideout
(74) *Attorney, Agent, or Firm* — McAndrews, Held & Malloy, Ltd.

(57) ABSTRACT

A method and system for registering wireless devices with a base unit that is configured to communicate wirelessly with multiple wireless devices. In one example, the wireless devices are cordless handsets of cordless telephone systems. When placed in a charging cradle, an unregistered handset displays a message indicating that the handset should be registered. A user provides local input to the base unit to activate a registration sequence. A three-way handshake is initiated at the base station, wherein a sequence of three wireless messages are passed between the base and unregistered handset. The handset displays a message indicating successful registration.

21 Claims, 13 Drawing Sheets

U.S. PATENT DOCUMENTS

2007/0049342 A1* 3/2007 Mayer et al. .................. 455/558

FOREIGN PATENT DOCUMENTS

| DE | 19740934 | 4/1999 |
|---|---|---|
| DE | 10000963 | 8/2001 |
| EP | 0164312 | 12/1985 |
| WO | 9931859 | 6/1999 |

OTHER PUBLICATIONS

Uniden TCX 805 Accessory Handset Owner's Manual (Online Electronic Copy), 2005.
Uniden TCX 805 Accessory Handset Quick Start Guide, 2005.
German Office Action dated Jun. 17, 2010 (Translation provided).

* cited by examiner

| Message Displayed | Meaning |
|---|---|
| NOT REGISTERED | HS is not registered. This is the permanent display for an unregistered handset. This message can also indicate a failed registration attempt. |
| REGISTER AT BASE | Display shown after an unregistered handset is placed in a charger (90 second timeout). HS is monitoring RF for special registration signal from BS. User should press PAGE on base unit for 4 seconds while message is displayed. |
| HS x REGISTERED | Display shown after successful registration (normal feature timeout). |

FIGURE 2a

| Message Displayed | Meaning |
|---|---|
| NOT REGISTERED | HS is not registered. This is the permanent display for an unregistered handset. This message can also indicate a failed registration attempt. |
| PRESS PAGE FOR 4 SECS ON BASE | Display shown after an unregistered handset is placed in a charger (90 second timeout). HS is monitoring RF for special registration signal from BS. User should press PAGE on base unit for 4 seconds while message is displayed. |
| HS x REGISTERED | Display shown after successful registration (normal feature timeout). |

FIGURE 2b

| Message Displayed | Meaning |
|---|---|
| NOT REGISTERED | HS is not registered. This is the permanent display for an unregistered handset. This message can also indicate a failed registration attempt. |
| PLEASE REGISTER PRESS PAGE FOR 4 SECS ON BASE | Display shown after an unregistered handset is placed in a charger (90 second timeout). HS is monitoring RF for special registration signal from BS. User should press PAGE on base unit for 4 seconds while message is displayed. |
| HS x REGISTERED | Display shown after successful registration (normal feature timeout). |

FIGURE 2c

| Message Displayed | Meaning |
|---|---|
| Not Registered | HS is not registered. This is the permanent display for an unregistered handset. This message can also indicate a failed registration attempt. |
| Register handset: Press the MENU key on the base. Find 'Register Handset' in menu. Press SELECT. | Display shown after an unregistered handset is placed in a charger (90 second timeout). HS is monitoring RF for special registration signal from BS. User should press PAGE on base unit for 4 seconds while message is displayed. |
| HS x REGISTERED | Display shown after successful registration (normal feature timeout). |

FIGURE 2d

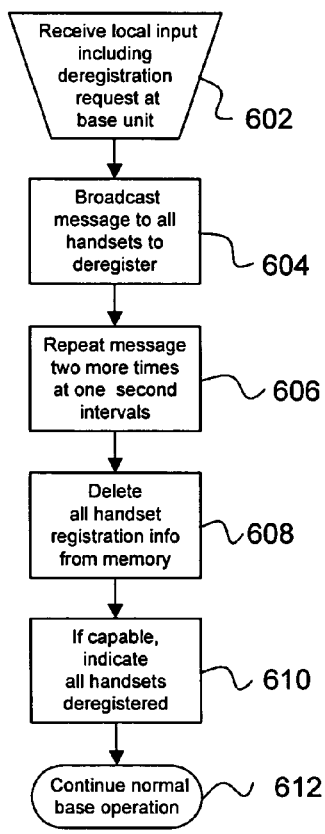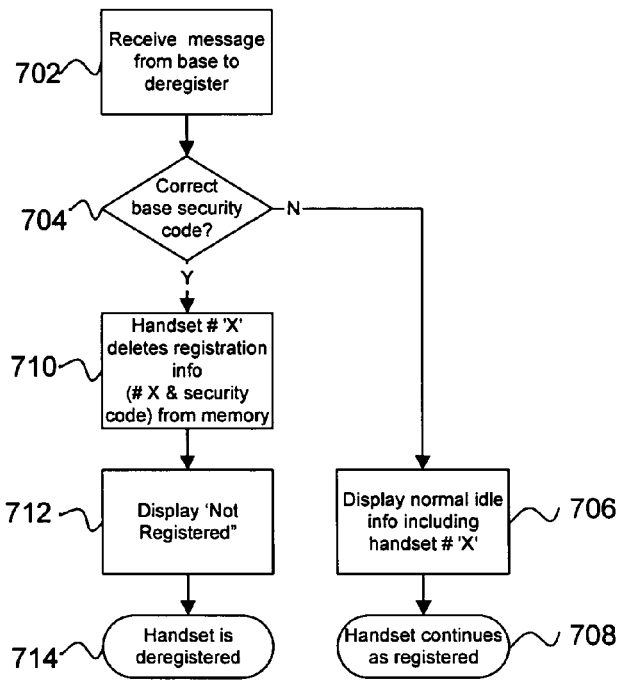
FIGURE 6  FIGURE 7

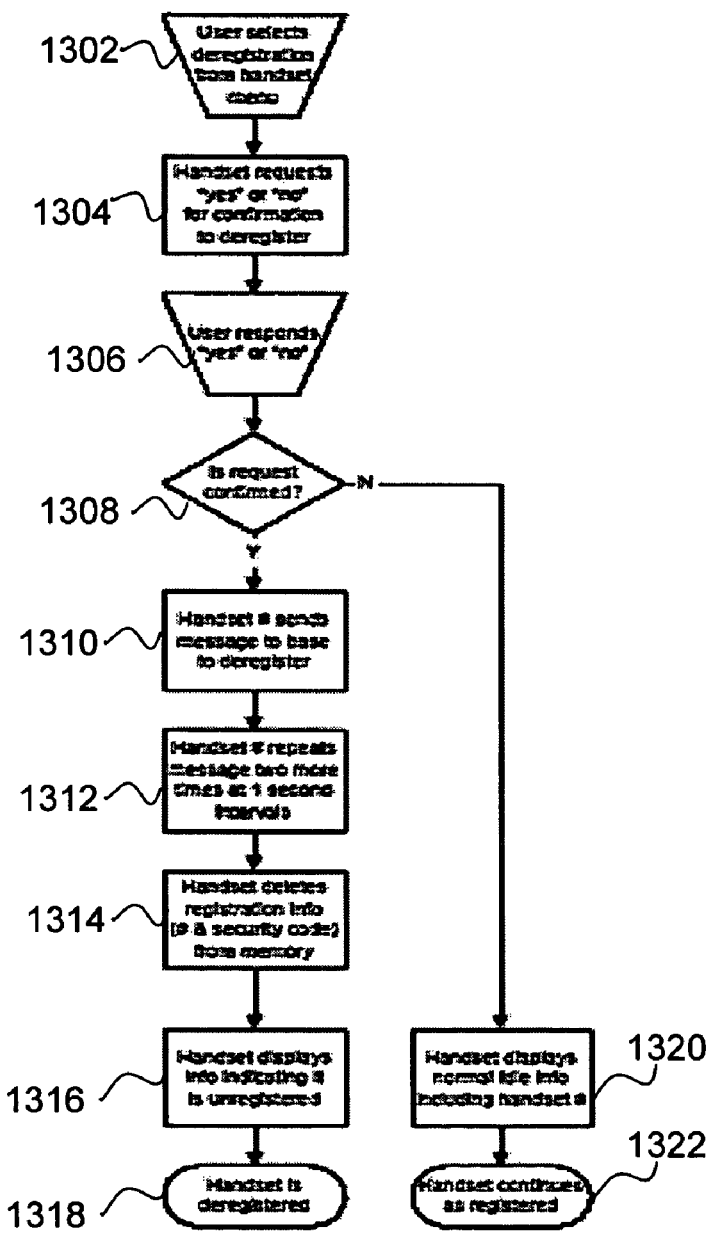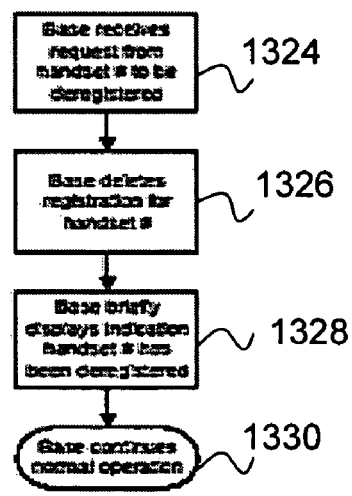
FIGURE 13a  FIGURE 13b

SYSTEM AND METHOD FOR CORDLESS HANDSET REGISTRATION

This application claims the benefit of U.S. Provisional Application No. 60/740,646, filed Nov. 30, 2005, which is herein incorporated by reference in its entirety.

BACKGROUND

1. Field of the Invention

The present invention relates generally to communications systems. More particularly, the present invention relates to communications between local wireless devices.

2. Background

In today's home and office environment, wireless devices such as cordless telephone systems are nearly ubiquitous. Often a user may desire to add cordless handsets to a cordless telephone system that includes a base station unit and a set of portable handsets. For example, an initially purchased handset may become disabled or destroyed, and a user may need to replace the handset. In addition, a user may simply wish to add a cordless handset to an existing system to increase the number of rooms in a house that contain a handset.

When adding a handset to an existing cordless telephone system, a user is required to register the handset with the system. This typically involves the user having to determine an identification number associated with a base unit of the system (base ID), after which the base ID must be entered into the handset through an interface, such as a keypad normally used for dialing. Because the base ID typically is a 15 digit number, the process is cumbersome and prone to error.

SUMMARY OF THE INVENTION

In an embodiment of the present invention, a method for registering a wireless device, such as a cordless handset with a communications system, such as a cordless telephone system, comprises a first step of monitoring, at the wireless device, for receipt of a registration signal from a base unit of the wireless communications system. An acknowledgement message from the wireless device is sent over an air interface if the registration signal is received. A registration authorization signal sent in response to the acknowledgment message is then received at the wireless device. In one embodiment of the present invention, before monitoring for a registration signal, the handset detects the presence of a flow as a result of being placed in a current source device. The current source device is preferably a charging cradle. The charging cradle can be integral to a base unit (also termed herein "base station") or a stand alone cradle. A message is displayed that alerts a user that the handset needs to be registered. Input is received locally at the base station alerting the base station of a request to register the handset. Preferably, the user manually inputs the registration request into the base unit through a button, keypad or other interface. A registration signal is broadcast from the base station. The handset detects the registration signal and sends an acknowledgment to the base station, including a unique ID. The base station sends an authorization including the unique ID, which is only accepted by the handset associated with the unique ID.

In accordance with the above method, a cordless handset can be added to a cordless system without a user having to manually input long identification codes into the system. At the same time, the user is assured that registration of preexisting handsets is not affected by the process.

In another embodiment of the present invention, a system for enhanced registration of an unregistered cordless handset includes a charging cradle. The charging cradle is configured to supply current to an unregistered cordless handset when the handset is placed therein. A cordless handset includes a registration-check routine that is activated when the handset receives current in the charging cradle. The registration-check routine determines whether the handset is registered or not and indicates through an interface when the handset is not registered. The handset is further configured to generate a temporary ID uniquely associated with that handset. A base station is provided that includes a user interface to receive a registration input request locally. In exemplary embodiments, the user interface of the base station comprises a menu on a display screen in which a user can select a registration routine. The base station is configured to broadcast a registration message containing a security code to receiving units within a broadcast area, and to receive an acknowledgement from the unregistered handset containing the unique ID. The handset further includes a memory that is updated when it receives authorization from the base unit for registration. The memory preferably includes the security code and a handset number assigned to it by the base unit during registration. The base unit further includes an internal handset registration database that is updated when registration is completed.

DESCRIPTION OF THE DRAWINGS

FIGS. 2a-2d illustrate exemplary message formats related to handset registration, according to alternative embodiments of the present invention.

FIG. 6 illustrates exemplary steps involved in a method for deregistering a registered handset, in accordance with another embodiment of the present invention.

FIG. 7 illustrates exemplary steps involved in a method for deregistering a registered handset, in accordance with another embodiment of the present invention.

FIGS. 13a and 13b illustrate exemplary steps involved in a method for handset deregistration, as performed at a handset and base unit, respectively, according to a further embodiment of the present invention.

DETAILED DESCRIPTION OF THE INVENTION

Figure 1:
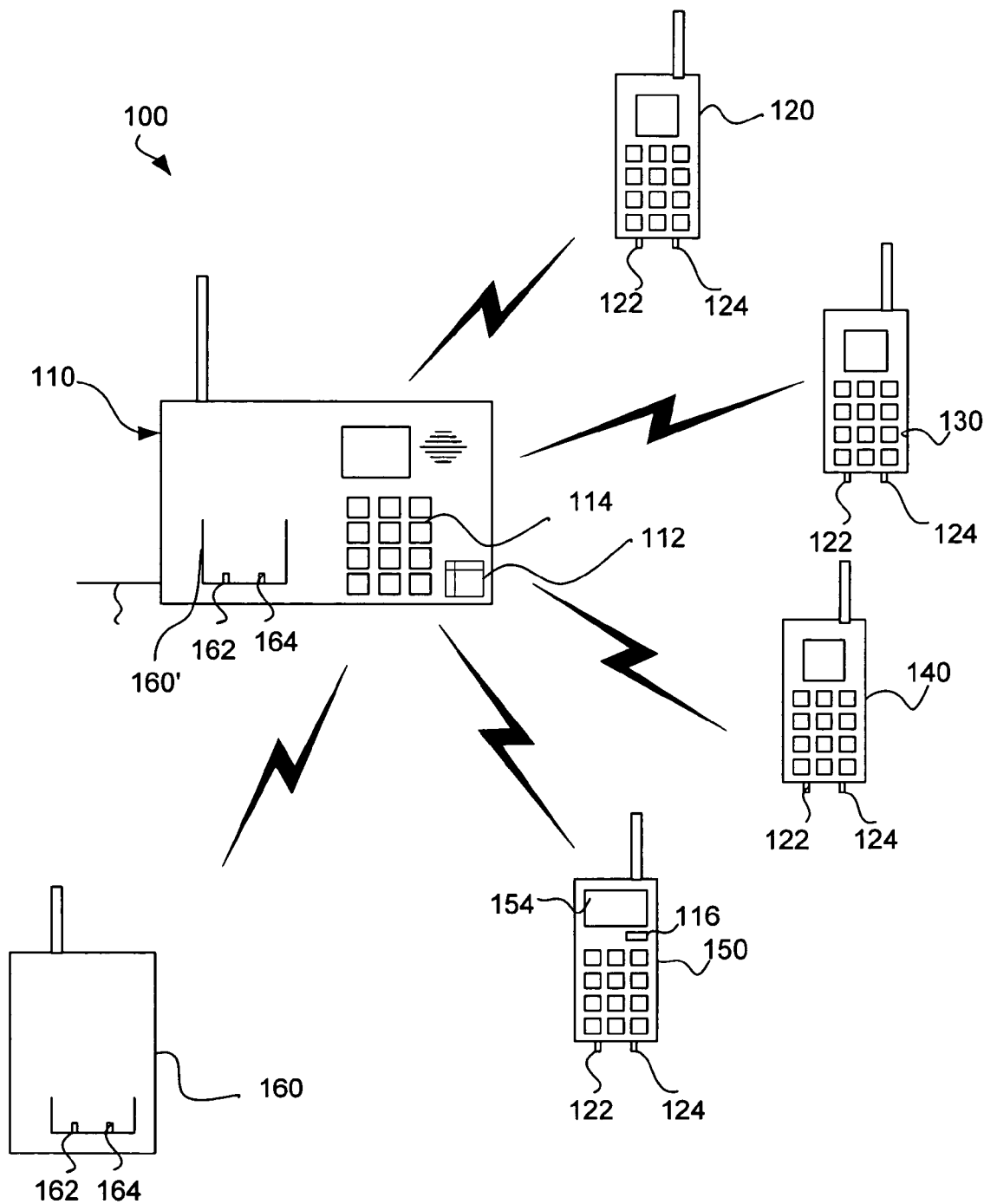
FIG. 1 illustrates a system for enhanced registration of a wireless device with a base unit, according to one embodiment of the present invention.

FIG. 1 illustrates a system 100 for enhanced registration of a wireless device with a base unit, according to one embodiment of the present invention. Many digital and analog wireless phone systems can accommodate registration of more than one handset. System 100 provides for registration of multiple handsets with a base unit for either analog or digital devices. System 100 includes base unit 110 (also termed "base station" or "base" herein) and wireless devices (also termed "handsets" or "cordless handsets" herein) 120, 130, 140, 150 that are capable of wireless communication with base unit 110. System 100 is preferably configured such that a user of any of the handsets can conveniently access base unit 110. For example, system 100 can be a cordless telephone system deployed in a home environment where a user can walk from any cordless handset or charging cradle location to a base unit in less than a few minutes. System 100 additionally includes one or more current source devices 160 that are configured to receive the wireless devices. In particular interface 160 can be a charging cradle that can be used for handset charging through contacts 122, 124 of a handset using leads 162, 164. In the embodiment disclosed in FIG. 1, base unit 110 also includes a charging cradle 160' integral to the base unit.

Base unit 110 includes a memory 112 that contains a handset registration database containing information related to handsets that are registered with base unit 110. Preferably, base unit 110 is configured to communicate only with those handsets that are registered to base unit 110. Accordingly, other wireless devices that are not registered with base unit 110 will not establish communications thereto. Memory 112 includes a fixed amount of registration slots, where each registration slot is allocated to a separate handset. The term "registration slot", as used herein, refers to a data structure, software, or other entity that is configured to contain information specific to a particular handset registered to a base unit, and is stored in the base unit. Because of system memory and processor limitations, among other factors, the number of registration slots available are limited. For example, in one embodiment of the present invention, the amount of registration slots available is four. Thus, only four separate handsets can be registered to base unit 110 at one time.

In many wireless systems such as cordless phone systems a user wishes to add a handset to the preexisting system. According to one embodiment of the present invention, a user of system 100 can conveniently add a new handset unit to the system using base unit 110 and current source device (hereinafter referred to also as "charging cradle") 160. For example, handset 150 may be a new store bought wireless device that the user wishes to add to a preexisting system that includes base 110 and handsets, 120, 130, 140, as well as charging cradle 160. When the user wishes to register handset 150 with base unit 110, the user places handset 150 in current source device 160. When handset 150 is placed in current source device 160, handset 150 checks whether it is registered. For example, current source device 160 can be a charging cradle that supplies current to the cradled handset. Processor 116 then detects that handset 150 is drawing current from charge cradle 160, determines that handset 150 is not registered, and displays a message to the user indicating that the handset is to be registered. For example, handset 150 can be provided with a registration check routine that is triggered to be performed by processor 116 when it detects that the handset is in the charging cradle. If the processor determines an unregistered condition, it then sends a signal for the handset to provide a signal to the user that registration is required (hereinafter, term "registration required indication" is used to denote a signal or message provided to a user that indicates a wireless device is unregistered and/or the wireless device requires registration). In one example of a registration required indication, display 154 may indicate the message REGISTER_AT_BASE to the user. The user can then go to base 110 and, using base user interface 114, initiate a registration sequence for the handset. Base user interface 114 can be a menu key, a PAGE button, or a series of keys used to access a menu, as described further below.

In a preferred embodiment of the present invention, registration of a new handset with base 110 proceeds using a three-way handshake. The three-way handshake entails a series of three radio communication messages, the first and third of which are sent from base unit 110 to the registering handset, and the second of which is sent from the registering handset to base unit 110. As described in more detail below, this procedure ensures that at most one handset is registered to base unit 110 for any given handset number.

In the first message of the three way handshake, base unit 110 broadcasts a registration signal that includes a handset number to be assigned to the new handset. For example, handset 150 may be eligible to be designated with the nickname "HS4" by base unit 110. Handsets 120, 130, and 140 are already registered and designated with nicknames HS1, HS2 and HS3, respectively. By assigning handsets nicknames, the base unit can effectively manage communications with multiple handsets. The handset nicknames can be associated with available registration slots, for example. When communicating with any registered handset base unit 110 can correctly identify each separate handset registered in a registration slot. This is especially useful, for example, during actual voice communications. For example, in a TDMA phone system if two handsets go off-hook in response to an incoming call, base unit 110 can establish simultaneous voice communications with the two handsets, by dynamically assigning to each registered handset a distinct pair of communications slots for that handset, thus allowing effective duplex communications with each handset, without interference between different handsets, since each pairs of communications slots corresponding to a given handset does not overlap in time with any other pair of communication slots.

In the second stage of the three way handshake, handset 150, after receiving the broadcast message, returns an acknowledgment message to base unit 110. The acknowledgement message includes an identification (ID) that identifies handset 150 as the one sending the acknowledgment message. The ID could be, for example, a tuned automatic test equipment (ATE) parameter that has a high probability of being unique to the handset, or alternatively, could be generated based on a free running timer. In the third message, base unit 110 broadcasts a registration acknowledgment message including the ID received from handset 150. Handset 150 can receive the acknowledgment message and update internal memory 116 with handset number "HS4" and any other information received from base unit 110 during registration if the ID matches the one it originally sent. Because the message contains the ID unique to handset 150, handsets 120-140 ignore the broadcast registration acknowledgment message. Base unit 110 can then update internal handset registration database 112 and registration is complete.

System 100 thus provides a convenient manner to register a wireless device with a base station, without the need of a user to record or memorize detailed information associated with the wireless device. Moreover, a user of the unregistered wireless device need not know or remember that the wireless device is unregistered, since the user is alerted as to the unregistered status, for example, when the wireless device is place in a charge cradle. In addition, because registration is initiated at the base station, inadvertent registration of a wireless device to the wrong base station, such as a base station in a neighbor's apartment, is prevented. Finally, during registration of a first unregistered wireless device, other wireless devices, such as additional unregistered handsets are not inadvertently registered with the same nickname.

Figure 2:
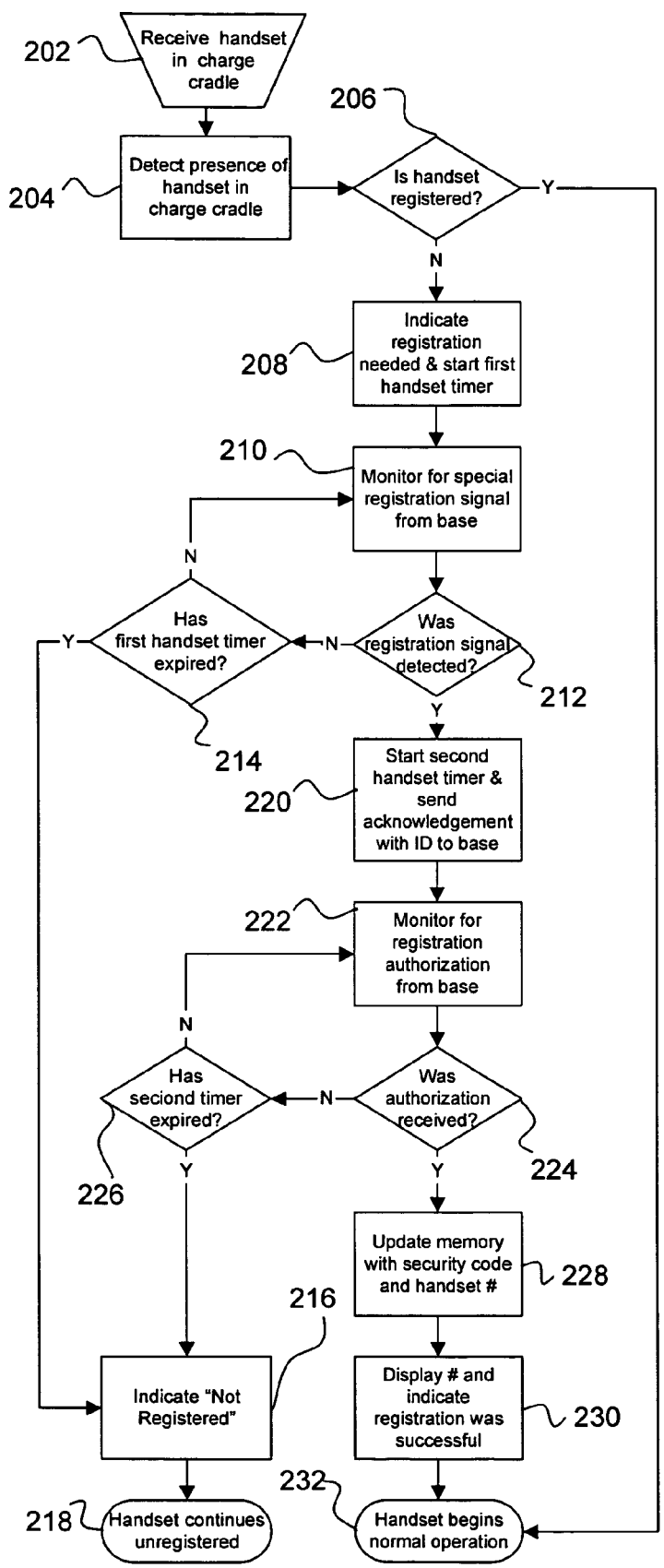
FIG. 2 illustrates exemplary steps involved in a method for enhanced registration of a wireless device with a base unit, according to an exemplary embodiment of the present invention.

FIG. 2 illustrates exemplary steps involved in a method for enhanced registration of a wireless device with a base unit, according to an exemplary embodiment of the present invention. The steps shown are those that occur in the wireless device.

In step 202, a current source device such as a charge cradle receives a handset.

In step 204, the handset receives charging current and detects that it is in a charging cradle.

After detecting that it is a charging cradle, in step 206, the handset determines whether it is registered to the base unit. If already registered, the process moves to step 232 where the handset resumes normal operation. If the handset determines that it is not registered, the process moves to step 208.

In step 208, the handset displays an indication that registration is needed. In exemplary embodiments of the present invention, the indication is provided through a message or series of messages in an LCD display on the handset.

FIGS. 2a-2d illustrate exemplary message formats (together with message explanations) indicating that registration is needed (a "registration required" signal, or message) or that registration is successful, according to alternative embodiments of the present invention. FIG. 2a displays text messages appropriate for a one-line dot matrix display. When the handset display is powered on, for example, the handset may display the default message NOT REGISTERED if the handset is not registered. This can occur when the handset is placed in a charging cradle, but also may occur when an unregistered handset is otherwise powered on. The further message REGISTER AT BASE appears after the handset is placed in the charging cradle and determines that it is not registered.

FIG. 2b illustrates exemplary messages displayed when a handset having a two-line dot matrix display is placed in a charging cradle. In addition to an initial NOT REGISTERED message that may be displayed in advance of or after placing the handset in the cradle, the handset displays the message PRESS PAGE FOR 4 SECS ON BASE. The latter instructions indicate that the user is to depress and hold a PAGE key that is provided on the base unit that is used to initiate the registration process.

FIG. 2c illustrates a similar message display sequence appropriate for a four-line dot matrix display in which the handset displays in sequence the messages NOT REGISTERED and

PLEASE REGISTER
PRESS PAGE FOR 4
SECS ON BASE

Finally, FIG. 2d illustrates a illustrates a message display sequence appropriate for a six-line dot matrix display the handset displays in sequence the messages NOT REGISTERED and REGISTER HANDSET:
PRESS THE MENU KEY
ON THE BASE. FIND
'REGISTER HANDSET' IN
MENU. PRESS SELECT In addition, in step 208, when the handset displays a message indicating the need to register with a base unit, a first handset timer is started. The first handset timer is configured to allow the handset to register within a certain time window. In one example, the duration of the first handset timer is about 60 to 180 seconds.

In step 210, the handset monitors for a registration signal from the base unit. When the handset detects a registration signal from the base, it can then proceed to initiate the second portion of a three way registration handshake as described above. The registration signal may include, for example, a security code and handset number to be assigned a handset if the registration is successful.

In step 212, if it is determined that a registration signal has not been received, the process moves to step 214, where the handset checks to see if the first handset timer has expired. If the first handset timer has expired, the process moves to steps 216 where the message NOT REGISTERED is again displayed on the handset, and the handset continues unregistered in step 218.

If, in step 214, the timer has not expired, the process moves to step 210 where the handset continues to monitor for a registration signal from the base unit. When a registration signal is detected in step 212, the process moves to step 220.

In step 220 the handset starts a second handset timer and sends an acknowledgment back to the base station. In one example, the duration of the second handset timer is about 15 to 60 seconds. As indicated above, the acknowledgment contains ID information designed to uniquely identify the handset to the base unit.

In step 222, the handset monitors for registration authorization from the base unit.

In step 224, the handset determines whether an authorization including the ID information sent in step 220 was received. If authorization was not received the process moves to step 226.

In step 226, the handset determines whether the second handset timer has expired. If the second handset timer has expired, the process moves to step 216 where the handset displays the NOT REGISTERED message. If the second handset timer has not expired, the process returns to step 222.

If authorization is received in step 224, the process moves to step 228.

In step 228, the handset updates its memory with information received from the base station during the registration process. For example, the information can include the handset number assigned and the security code.

In step 230, after successful registration, the handset indicates that registration was successful. For example, in any of one-, two-, four-, or six-line dot matrix displays the message HANDSET X REGISTERED could be displayed, where "X" stands for a handset number that is actually displayed.

Figure 3:
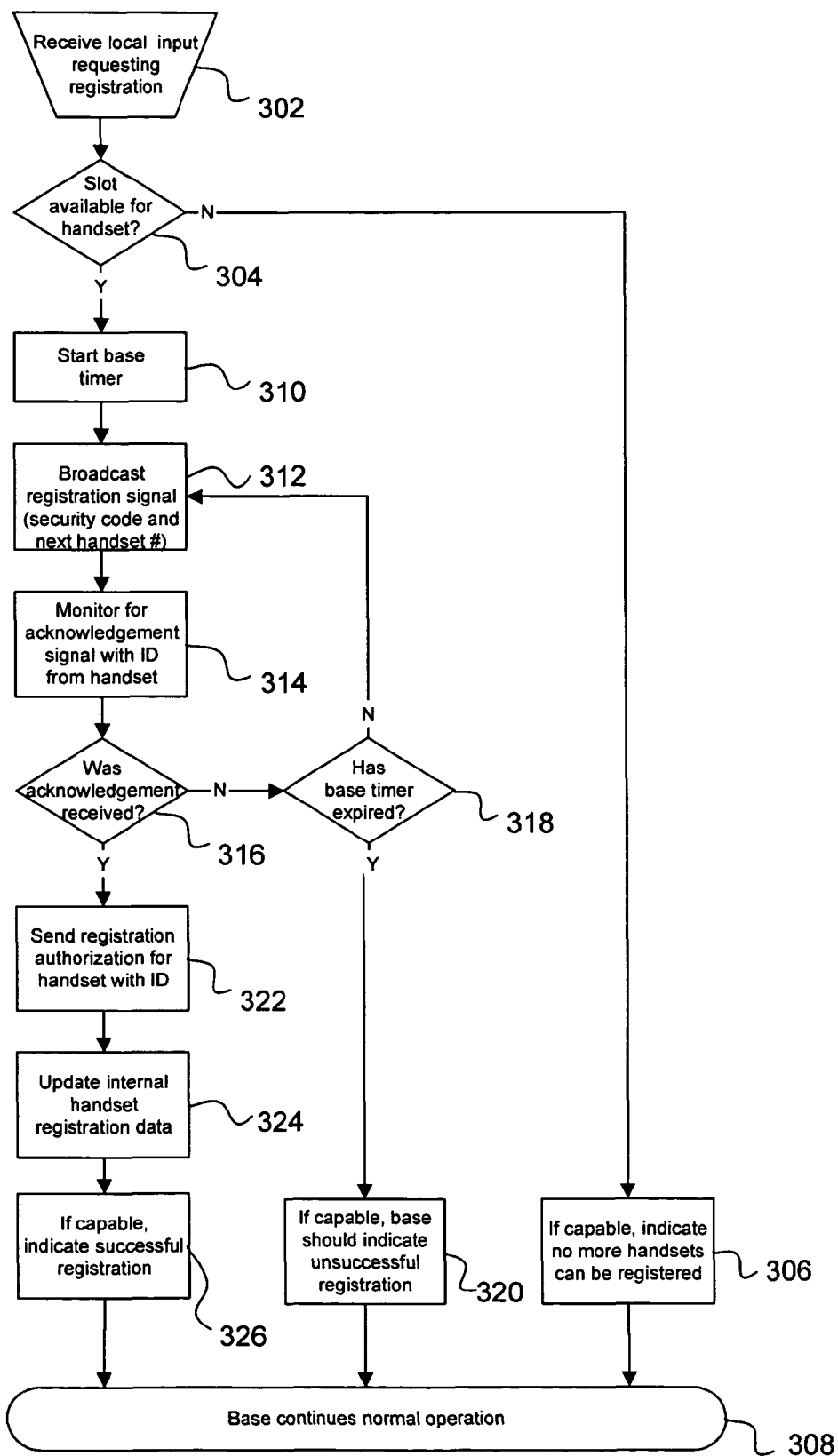
FIG. 3 illustrates exemplary steps involved in a method for enhanced registration of one or more wireless devices with a base unit, according to an exemplary embodiment of the present invention.

FIG. 3 illustrates exemplary steps involved in a method for enhanced registration of one or more wireless devices with a base unit, according to an exemplary embodiment of the present invention. The steps shown are those that occur in the base unit.

In step 302, the base unit receives local input requesting registration of a handset. For, example a user may place a handset in a charging cradle and determine that the handset requires registration with the base unit. The user then proceeds to the base unit and initiates a registration request by pressing a button or accessing a menu on the base unit. For, example, as discussed above with respect to FIG. 3*d*, the base unit may be provided with a dot matrix display, a user-selectable menu, such as a scrollable menu, and menu keys that allow a user to select a 'REGISTER HANDSET' option that initiates a handset registration process after selection.

Alternatively, the base unit may be provided with a PAGE key (button) that is depressed by a user to initiate the registration process. In one embodiment of the present invention, as indicated in FIG. 2*c*, a user presses a PAGE key for four seconds. Preferably, the handset registration process is initiated after the PAGE key is depressed for about two seconds, so that a user is likely to successfully initiate the registration process by depressing the key for four seconds.

In step 304, the base unit determines whether a registration slot is available to register an unregistered handset. For example, a base unit having four registration slots may determine that three handsets are registered and one registration slot that is not associated with a registered handset remains. If the base unit determines that no registration slots are available to register a handset, the process moves to step 306.

In optional step 306, the base unit, if capable, indicates that no more handsets can be registered. For example, a dot matrix equipped base unit may display NO MORE HANDSETS ALLOWED, after a PAGE button is depressed for more than two seconds. The process then moves to step 308 and the base unit resumes normal operation. The terms "normal operation" or "normal operation state," as used herein, refer to the state when the base unit does not perform operations associated with registering a new wireless device, such as checking for available registration slots, broadcasting registration signals or monitoring for acknowledgment signals. If an open registration slot is determined to exist in step 304, the process moves to step 310.

In step 310 the base unit starts a base timer. The base unit timer is used to limit the period in which a registration attempt can take place. In one example, the base unit timer duration is about 15 to 120 seconds.

In step 312, the base broadcasts a registration signal as discussed above. The registration signal includes a security code and a handset nickname, such as HS4, that represents the designation for the next available handset. The registration signal is sent by RF signal and can be received by any compatible handsets that can establish an RF link with the base unit. However, registered handsets can ignore the broadcast registration signal.

In step 314, the base unit monitors to see if any handset is sending an acknowledgement signal. The base monitors to see if a signal from a handset is received, including a handset ID.

In step 316, if the base unit determines that an acknowledgment signal has not been received, the process moves to step 318.

In step 318, the base unit checks to see if the base timer has expired. If the base timer has expired, then the process moves to optional step 320, where the base unit indicates, if possible, that registration was unsuccessful. If the timer has not expired, the process returns to step 312.

If the base unit receives an acknowledgment with handset ID in step 316, the process moves to step 322.

In step 322, the base sends an authorization message that authorizes a handset with the received handset ID to register with the base unit.

In step 324, the base unit updates an internal handset (wireless device) database in the base unit that includes the newly registered handset ID and the associated handset number (nickname, such as HS4). The base unit can then communicate with the new handset designated as HS4. For example, in the case of a TDMA system it can allocate specific communication slots to send and receive voice or data with HS4.

In optional step 326, the base unit indicates that registration was successful.

Figure 4:
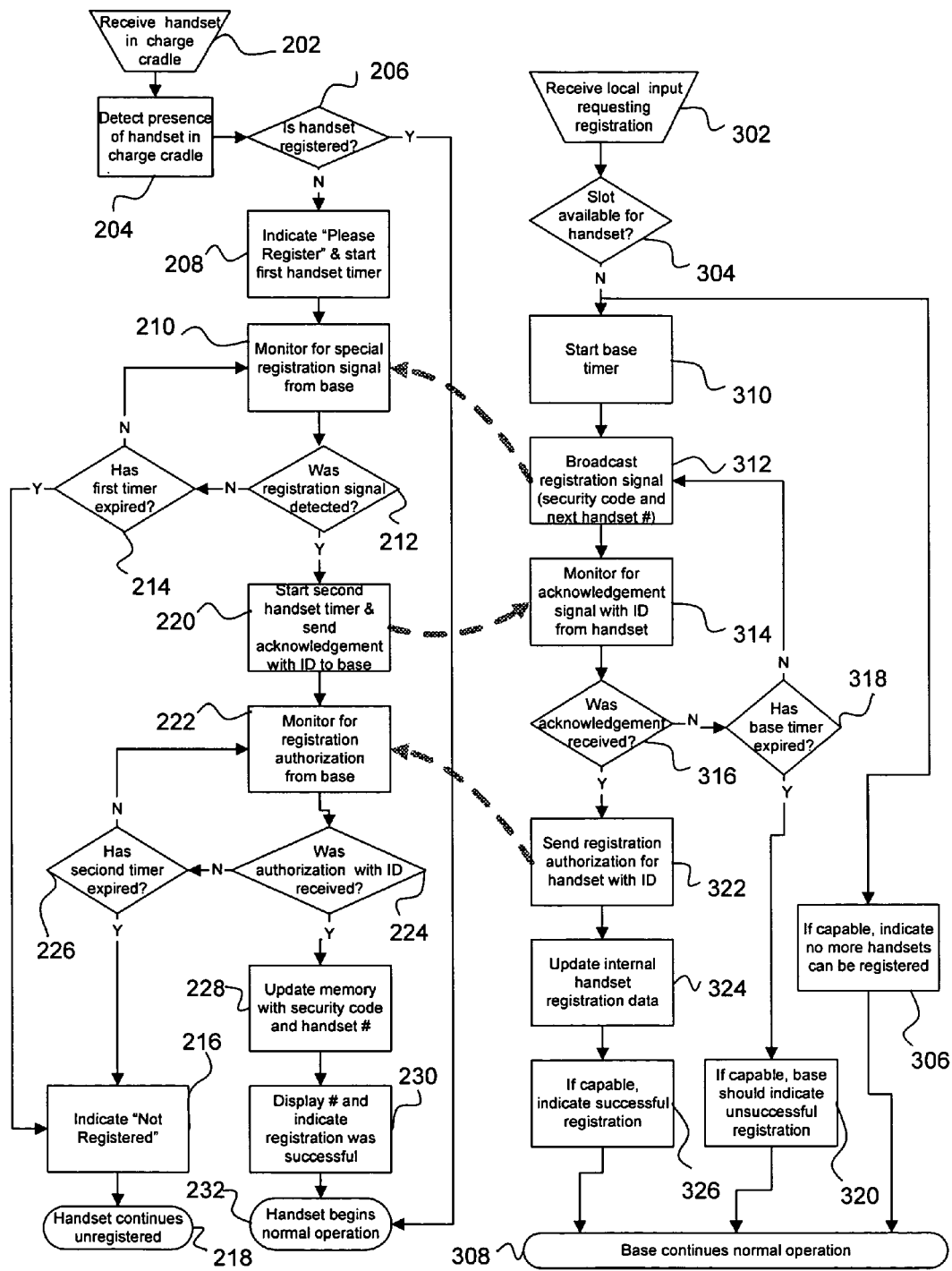
FIG. 4 illustrates the interrelation between specific steps of the exemplary method of FIG. 2 and corresponding steps in the method of FIG. 3.

FIG. 4 illustrates one example of how the specific steps of the exemplary method of FIG. 2 and corresponding steps in the method of FIG. 3 can be interrelated. The messages of the three way handshake, which are sent as wireless communications between handset and base station, are indicated as dotted arrows. Thus, as shown in FIG. 4, in one embodiment of the present invention, in a single registration process for an unregistered wireless device, the exemplary steps in the inventive method that are outlined in FIG. 2 are performed at the wireless device, while those steps in the inventive method outlined in FIG. 3 are performed at the base unit.

In one embodiment of the present invention, the handset is configured to engage in the three way handshake registration process only after being placed in a current source such as a charging cradle. If the registration process of a handset is unsuccessful, the handset can be removed from the current source, such as being removed from a charging cradle, and then replaced in the current source device. The handset is configured to detect its removal from and replacement in the current source, after which the process according to steps 202-232 is performed again. A user can then reinitiate a handset registration process by performing step 302 once more, for example, depressing a page key on the base unit.

In one embodiment of the present invention, the handset is only configured to perform steps 210, 220 and 222 if it is in a charging cradle or similar current source device. In other words, if the handset is not in a charging cradle it cannot participate in the three way handshake. In one embodiment of the present invention, a handset could indicate an unregistered status and start a timer after being powered on without being in a charging cradle. However, once a registration process is initiated at a base unit according to the steps outlined in FIG. 3, for example, the handset would be unable to participate in the three way handshake without being place in a charging cradle.

Thus, for example, a user attempting to make a phone call might first notice that the handset is unregistered when it displays an unregistered message after being powered on. The user then proceeds to place the handset in a charging cradle and to initiate a registration process by pressing a PAGE key at a base unit before expiration of a timer launched by the handset when it was turned on. In one particular embodiment of the present invention, the handset could be configured to provide a registration required indication upon power on or upon placement in a charging cradle, while also being configured to start a first timer only when being placed in a charging cradle. This would increase the likelihood of a successful registration process when a handset is powered on under conditions where the time required for placement of the handset in a charging cradle and initiating the registration process may exceed the duration of the first timer. For example, if a user is upstairs when powering on an unregistered handset and the charging cradle and base unit are both downstairs, the user could delay running downstairs to place the handset in the charging cradle, since the handset is configured to start the timer only when placed in the charging cradle.

In another embodiment of the present invention, a handset is configured to alert a user as to its unregistered status and to start a timer upon being powered on. Thus, after being powered on, the process proceeds according to steps 206-232.

In the case where a user wishes to register multiple unregistered handsets with a base unit, the above inventive method outlined in FIGS. 2-4 allows a user to register the unregistered handsets one at a time. Thus, a user can place a first unregistered handset in a charging cradle, and initiate a registration process at a base unit for the first handset. After the registration process is complete at step 232, the first handset can be removed and a second unregistered handset placed in the charging cradle or in a different charging cradle, after which the user initiates a second registration process at the base unit, and so forth.

In the case where more than one unregistered handset is to be registered with a base, in accordance with another embodiment of the present invention, mistakes in the registration process can be prevented. For example, a user may have two new handsets that are to be registered, both of which become activated within a radio communications range of a base unit. The handsets could become activated by being turned on or being placed in separate charging cradles. The user may then proceed to initiate a registration sequence with the purpose of registering a first handset placed in a charging cradle, possibly unaware that a second unregistered handset is active and able to receive and send messages to the base unit. Thus, the base unit could inadvertently attempt to register both unregistered handsets at the same time, resulting in both handsets being assigned the same registration slot.

Figure 5:
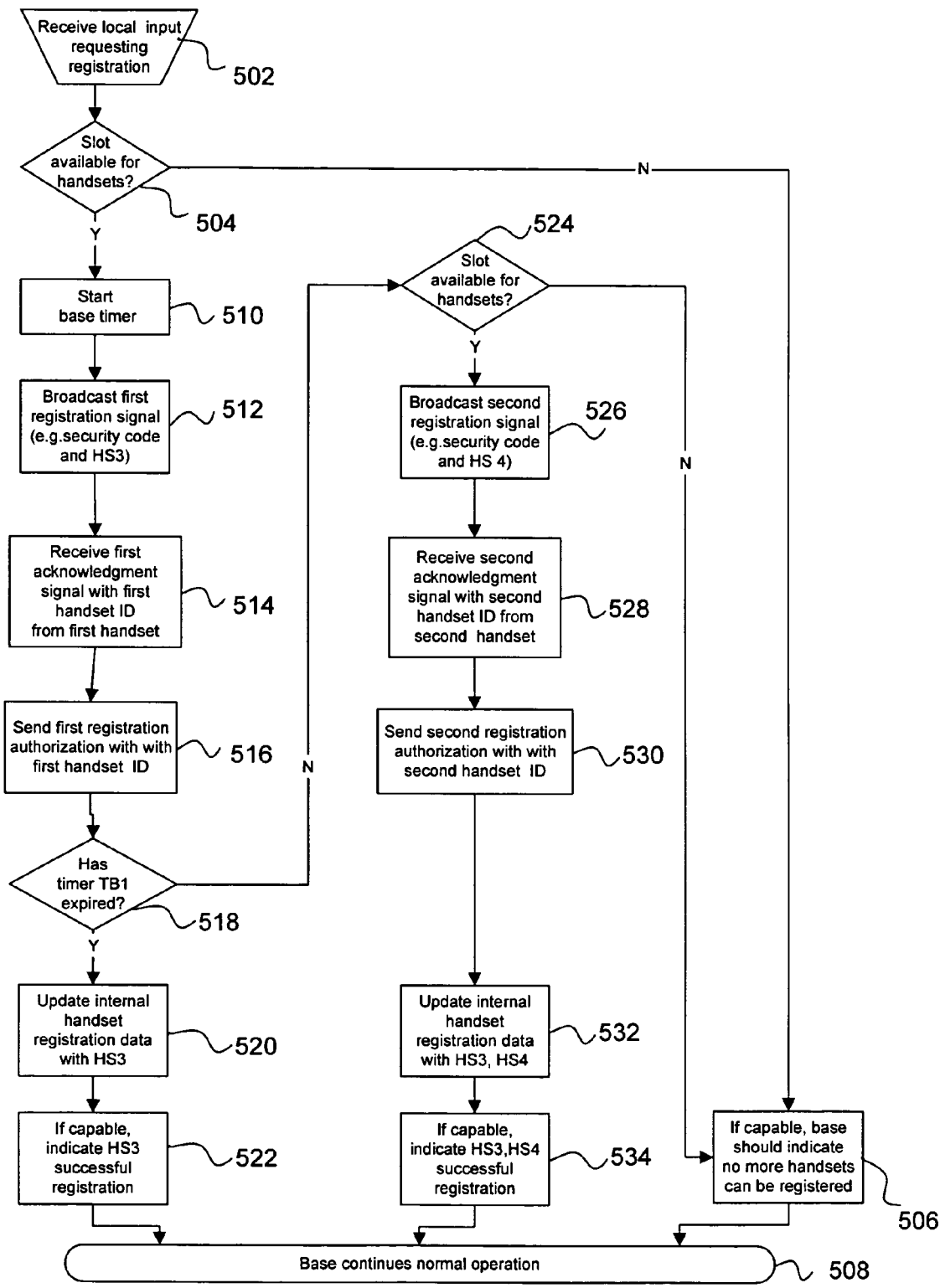
FIG. 5 illustrates exemplary steps involved in a method for preventing simultaneous registration of more than one handset into a single registration slot, according to an embodiment of the present invention.

FIG. 5 illustrates exemplary steps involved in a method for preventing simultaneous registration of more than one handset, according to an embodiment of the present invention.

In step 502, a base unit receives local input through a user interface requesting initiation of a handset registration process, as discussed above. In step 504, the base unit determines whether any registration slots are available, and if not, the process moves to steps 506 and 508 where the base indicates no registration slots are available, and resumes normal operation.

In the case where registration slots are available, the process moves to step 510. For example, a user may have two new unregistered handsets, X and Y, and two already registered handsets in a system that accommodates four registration slots. The base unit determines in step 504 that two registration slots are available, and starts a timer in step 510.

In step 512, a first registration signal is broadcast. The registration signal includes handset information such as HS3 designating the next slot to be registered with the base unit. The registration signal may then be received, for example, by a plurality of active handsets. Both unregistered handsets X and Y, if active, receive the broadcast registration signal. Both send acknowledgement replies to the base unit.

In step 514, the base unit receives the first acknowledgement reply to reach it. For example, handset X might receive the broadcast signal and return an acknowledgment one half-second before handset Y does so. The acknowledgment received from handset X is then processed by the base unit, while the acknowledgment from handset Y is ignored. The processed acknowledgment includes handset ID information identifying the handset as IDX, where IDX stands, for example, for an alphanumeric identifier of handset X.

In step 516, the base unit sends a first registration authorization message including "IDX." This message is then received by handset X and ignored by handset Y, so that handset X completes successful registration.

In step 518, the base unit checks to see if the base timer has expired. If so, the process moves to step 520.

In step 520, the internal handset registration database in the base unit is updated to indicate that handset X is designated HS3 and allocated handset registration slot 3.

In step 522, the base unit indicates that HS3 is successfully registered.

If in step 218 the base timer has not expired, the process moves to step 524. In step 524, the base unit determines whether a handset registration slot remains open. If not the process moves to step 506 as described above. In the scenario in which another registration slot remains open, the process moves to step 526.

In step 526, the base unit sends a second broadcast registration signal indicating that handset HS4 registration slot is open. The broadcast signal may be received by previously registered handsets and handset X, but is ignored. However, handset Y, knowing that it is still not registered, receives the message and sends an acknowledgment to the base unit.

In step 528, the base unit receives a second acknowledgment message with "IDY" indicating that handset Y is registering.

In step 530, the base unit broadcasts a second registration authorization message including "IDY" which indicates the ID of the handset to receive the authorization. Handset Y can then receive the authorization message and complete successful registration as HS4 corresponding to the last open registration slot available. All other active handsets ignore the message because of the "IDY" included in the message indicating it is for handset Y.

In step 532, the base unit updates a handset registration database indicating that handsets X and Y are registered as HS3 and HS4, respectively.

In step 534, the base unit indicates that HS3 and HS4 are successfully registered.

Thus, proper registration of unregistered handsets is assured even in the case where multiple unregistered handsets are active.

FIG. 6 illustrates exemplary steps involved in a method for deregistering a registered handset, in accordance with another embodiment of the present invention. In the case where a user needs to register an additional wireless device (handset) to a base unit that has all available handset registration slots accounted for (registered to handsets), the user may decide to deregister all registered handsets. For example, in a four handset system in which the base unit has four available handset registration slots that are occupied by four registered handsets, handset three (HS3) is accidentally dropped in the pool and destroyed. The base unit does not realize that HS3 is no longer active and continues to broadcast to HS3. Additionally, the base unit will not allow registration of a new handset to the slot associated with the previous handset designated as HS3 because it determines the registration slot to be occupied with information related to the now defunct handset. In order add a new handset in place of "HS3" a user then proceeds to deregister the existing "good" handsets, so that when a new registration process is performed a total of four handset registration slots are recognized as available by the base unit.

In step 602, the base unit receives local input at a user interface on the base indicating that all handsets are to be deregistered. The local input can be, for example, a user depressing and holding a PAGE key on the base unit while the base unit is reconnected to AC power.

In step 604, the base unit broadcasts a message to all handsets to deregister.

In step 606, the deregister message is rebroadcast, for example, two more times at one second intervals to assure that all handsets within broadcast range of the base unit have received the message.

In step 608, all handset registration information is deleted from memory in the base unit, for example, from a handset registration database.

In step 610, the base unit indicates that all handsets are deregistered.

In step 612, the base unit resumes normal operation.

Accordingly, following the example above, a user can then proceed to register the three previously registered "good" handsets as well as the new handset in place of the destroyed handset, old HS3. The new registration process can be performed in any sequence of handsets so that the designation of handsets as HS1, HS2, and HS4 may be the same as previously, or may be different. In addition, the new handset need not be assigned as HS3.

FIG. 7 illustrates exemplary steps involved in a method for deregistering a registered handset, in accordance with another embodiment of the present invention. Although the procedure illustrated in FIG. 6 serves to deregister handsets with respect to a base unit, it does not ensure that the handsets "know" of the deregistration process. The method illustrated in FIG. 7 preferably takes place in conjunction with steps 602-612 of FIG. 6.

In step 702, a message is received in a wireless broadcast at a handset to deregister from the base unit.

In step 704, a determination is made as to whether security code information contained in the deregister message is correct. If the security code information is not correct, the process moves to step 706.

In step 706, the handset displays normal idle information, including designation of handset, for example, HS4.

In step 708, the handset continues as registered.

If in step 704 the security code information is determined to be correct, for example, if the security code information indicates that the message is broadcast from a base unit to which the handset is registered, the process moves to step 710 where the handset deletes registration information from its memory. For example, handset HS4 deletes "HS4" and security code information from its memory.

In step 712, the handset indicates or displays "not registered."

In step 714, the handset is now unregistered and is available to be registered to a base unit.

Accordingly, the method of FIG. 7 ensures that a handset will be properly deregistered only when it receives a deregistration message from the base unit to which it is registered.

Figure 8:
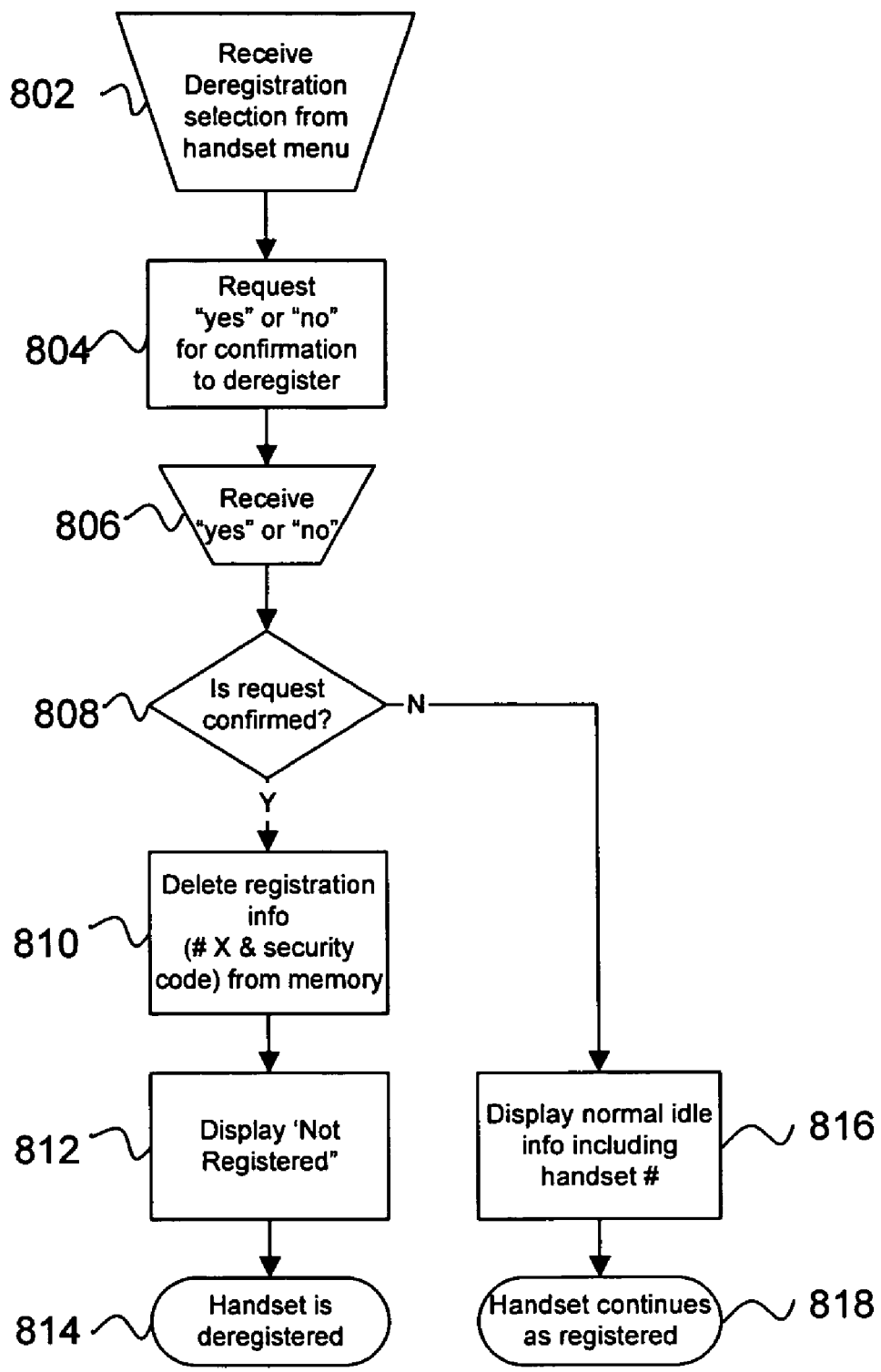
FIG. 8 illustrates a method for handset initiated handset deregistration, according to an embodiment of the present invention.

FIG. 8 illustrates a method for handset initiated handset deregistration, according to an embodiment of the present invention. Handset initiated deregistration could be used, for example, when a handset fails to deregister after a base unit initiated deregistration, illustrated above in FIGS. 6 and 7. A handset may have a dead battery or be out of RF communications range during the base initiated deregistration.

In step 802, the handset receives a user selection for deregistration from a handset menu.

In step 804, the handset indicates a request for a "yes" or "no" confirmation to the request for deregistration.

In step 806, the "yes" or "no" confirmation is received by the handset.

In step 808, if the confirmation is "yes" the method moves to step 810.

In step 810 registration information such as security code and handset number are deleted from the handset memory.

In step 812, the handset displays "not registered."

If a "no" confirmation is received in step 808, for example, if a user inadvertently requests deregistration in step 802 and cancels the request in step 806, the method moves to step 816 where the handset continues to display normal idle information including current handset number.

In step 818, the handset continues as registered.

FIGS. 9a through 13b illustrate exemplary steps involved in further methods for deregistration of handsets, according to additional embodiments of the present invention.

In step 902, a user selects deregistration from a base menu.

In step 904, the base requests to receive an indication of a particular handset or all handsets.

In step 906 the base receives a selection of either an individual handset designator, such as a handset number, or "all handsets."

In step 908, if the base determines that "all" is selected, the process moves to step 910. In step 910, the base broadcasts to all handsets to deregister.

In step 912, the message to deregister is repeated two more times at 1 second intervals.

In step 914, the base deletes from memory all handset registration information.

In step 916, the base displays temporarily a message that indicates that all handsets are deregistered.

In step 918, the base continues normal operation.

If, in step 908, a single handset is designated ("all" is not selected), the process moves to step 920. In step 920, the base sends a message to the handset designated in step 906 to deregister.

In step 922, the base repeats the broadcast message to deregister the designated handset two more times at one second intervals.

In step 924, the base deletes registration information concerning the handset designated in step 906.

In step 926, the base displays temporarily a message that indicates that the designated handset is deregistered.

Figure 9A:
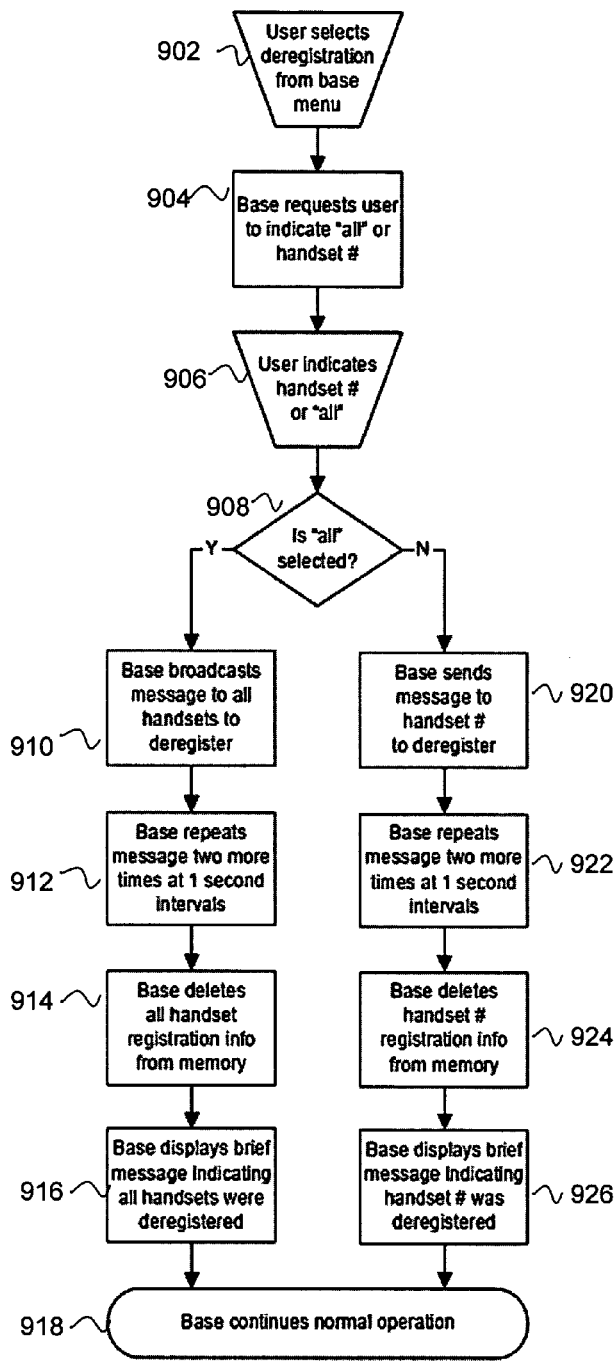
FIGS. 9a and 9b illustrate exemplary steps involved in a method for handset deregistration, as performed at a base unit and handset, respectively, according to another embodiment of the present invention.
Figure 9B:
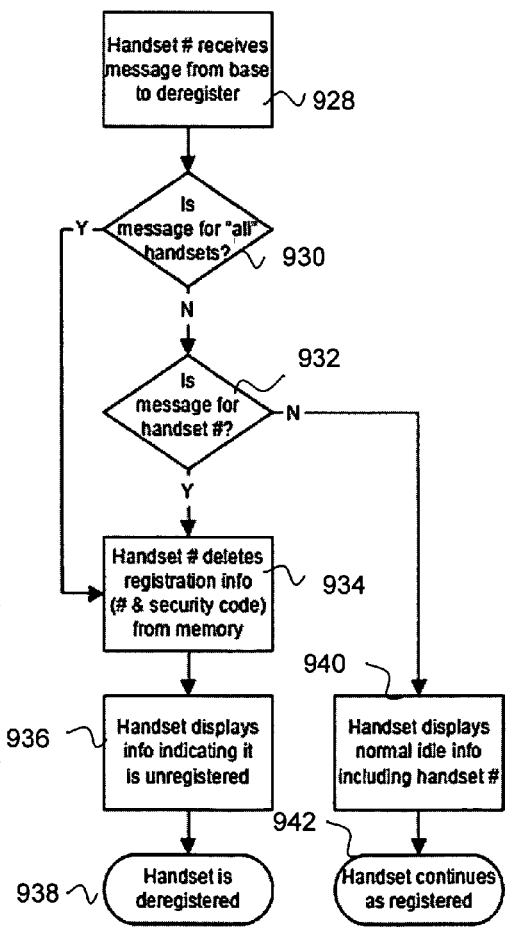

Referring now to FIG. 9b, in step 928 each handset receives a message from the base unit to deregister.

In step 930, if a receiving handset determines that the message is for all handsets, the process moves to step 934. If the handset determines that the message is not for all handsets, the process moves to step 932.

In step 932, if a receiving handset determines that the deregistration message is meant for that receiving handset, the process moves to step 934.

In step 934, the receiving handset deletes registration information such as a handset number and security code.

The process then moves to step 936 in which the handset displays information indicating that it is deregistered, and in step 938 the handset is in a deregistered state.

If, in step 932, the receiving handset determines that the message was not meant for that receiving handset, the process moves to step 940.

In step 940, the handset displays normal idle information, including its handset number and the handset continues as registered in step 942.

FIGS. 9a and 9b thus represent a broadcast-only method for deregistering a handset, with the base sending a message to either deregister all handsets or to deregister a specific handset. The handset deregisters itself if it receives at least one of the broadcast messages and if the message is either meant for all handsets or specifically for it. A receiving handset ignores a specific broadcast deregistration message that is determined to be meant for another handset.

Figures 10A, 10B:
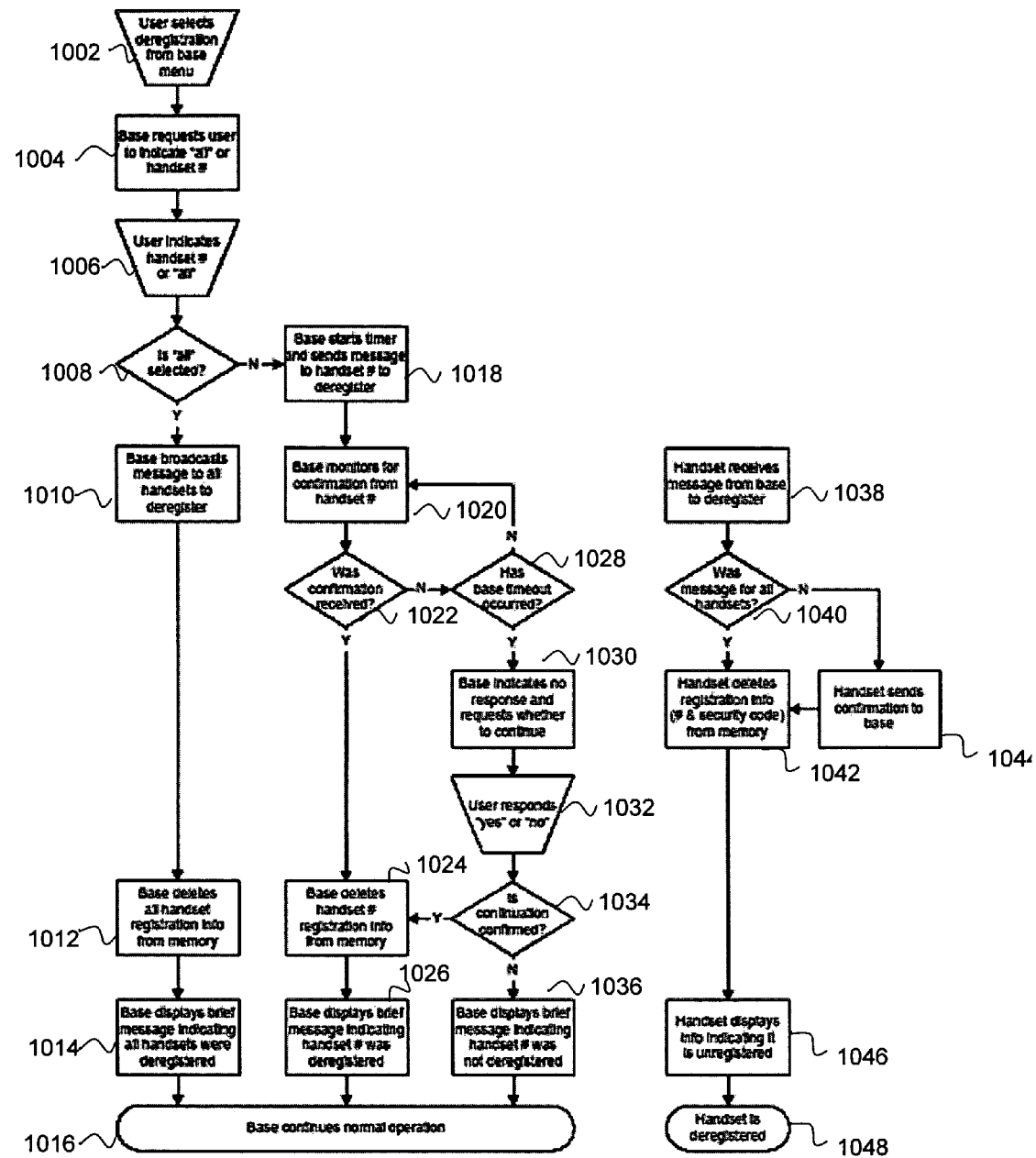
FIGS. 10a and 10b illustrate exemplary steps involved in a method for handset deregistration, as performed at a base unit and handset, respectively, according to a further embodiment of the present invention.

Referring now to FIG. 10a, in step 1002, a user selects deregistration from a base menu.

In step 1004, the base requests to receive an indication of a particular handset or all handsets.

In step 1006 the base receives a selection of either an individual handset designator, such as a handset number, or "all handsets."

In step 1008, if the base determines that all is selected, the process moves to step 1010. In step 1010, the base broadcasts to all handsets to deregister.

In step 1012, the base deletes from memory all handset registration information.

In step 1014, the base displays temporarily a message that indicates that all handsets are deregistered.

In step 1016, the base continues normal operation.

If, in step 1008, a single handset is designated ("all" is not selected), the process moves to step 1018. In step 1018, the base starts a timer and sends a message to the handset designated in step 1006 to deregister.

In step 1020, the base monitors for confirmation from the designated handset.

In step 1022, if confirmation is received from the handset, the process moves to step 1024.

In step 1024, the base deletes registration information concerning the handset designated in step 1006.

In step 1026, the base displays temporarily a message that indicates that the designated handset is deregistered.

In step 1016, the base continues normal operation.

If confirmation is not received in step 1022, the process moves to step 1028. In step 1028, if timeout of the base timer has not been reached, then the process moves to step 1020, where the base continues to monitor for confirmation from the designated handset.

In step 1028, if timeout of the base timer has occurred, the process moves to step 1030 where the base unit indicates that no response has been received and requests whether to proceed with the deregistration of the designated handset.

In step 1032, the base receives a yes or no answer from the user.

In step 1034, if continuation with the deregistration process is confirmed from user input received in step 1032, the process moves to step 1024. If continuation of deregistration is not confirmed (the user answers "no" in step 1032), the process moves to step 1036 in which the base temporarily displays a message indicating that the designated handset was not deregistered. The process then moves to step 1016.

Referring now to FIG. 10b, in step 1038, a handset receives a message broadcast from a base to deregister.

In step 1040, if the receiving handset determines that the message was meant for all handsets, the process moves to step 1042.

In step 1042, the receiving handset deletes registration information from its memory.

In step 1046, the receiving handset displays information indicating that it is unregistered, and in step 1048, the handset is in a deregistered state.

If, in step 1040, the receiving handset determines that the message was not meant for all handsets, the process moves to step 1044 where the receiving handset sends a confirmation message to the base. The process then moves to step 1042.

The deregistration process outlined in FIGS. 10a and 10b thus includes a similar broadcast method for deregistering all handsets to that illustrated in FIGS. 9a and 9b, buts also includes a 2-way handshake requirement for deregistering an individual handset. That is, in the case where only an individual handset deregistration is to take place, the base starts a timer when it sends the individual handset deregistration message and requires a response from the designated handset in a specified time window before deregistering it from the information stored in the base. However, there is a provision for manual override at the base, so that deregistration of the handset can proceed without receiving a confirmation. This allows for selective deregistration of a handset that was, for example, dropped in the pool, and is no longer able to function.

Figures 11A, 11B:
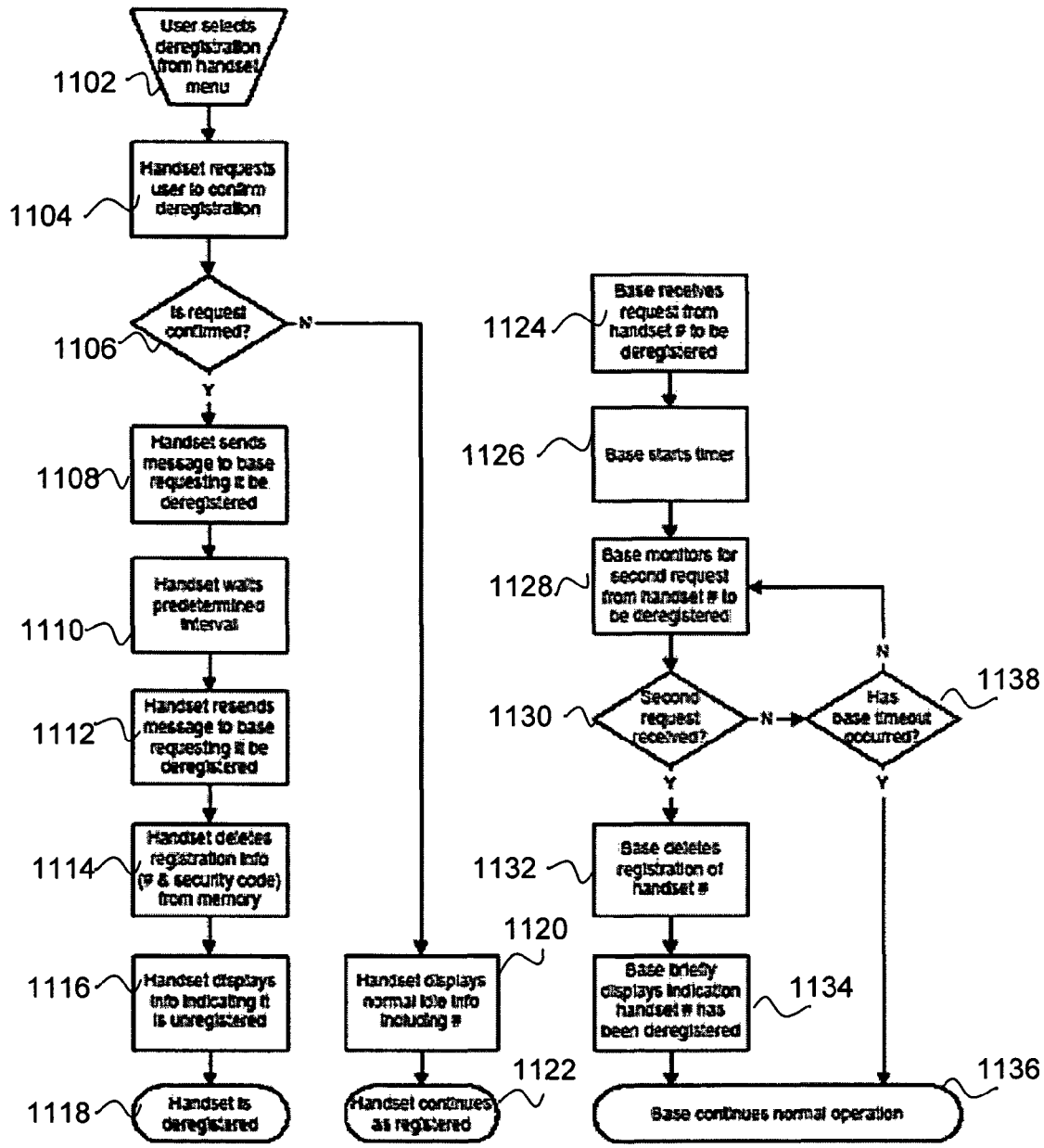
FIGS. 11a and 11b illustrate exemplary steps involved in a method for handset deregistration, as performed at a handset and base unit, respectively, according to another embodiment of the present invention.

Referring now to FIG. 11a, in step 1102, a user selects deregistration from a handset menu.

In step 1104, the handset requests confirmation of the deregistration selection.

In step 1106, the handset determines whether the deregistration selection is confirmed. If so, the process moves to step 1108.

In step 1108, the handset sends a message to a base unit requesting that the handset be deregistered.

In step 1110, the handset waits for a predetermined interval.

In step 1112, the handset resends to the base the message to request deregistration at the base.

In step 1114, the handset deletes from its memory all registration information.

In step 1116, the handset displays information that indicates that it is deregistered.

In step 1118, the handset is in a deregistered state.

Referring now to FIG. 11b, in step 1124, a base unit receives the request from a requesting handset to be deregistered.

In step 1126, the base unit starts a timer.

In step 1128, the base monitors for a second request from the requesting handset whose deregistration message was received in step 1124.

In step 1130, if a second request is received, the process moves to step 1132.

In step 1132, the base deletes the registration information concerning the requesting handset.

In step 1134, the base displays temporarily a message that indicates that the requesting handset is deregistered.

In step 1136, the base continues normal operation.

If, in step 1130, a second request is not received, the process moves to step 1138.

In step 1138, if the base timer has reached a timeout condition, the process moves to step 1136. If the timeout condition has not been reached, the process returns to step 1128.

FIGS. 11a and 11b thus illustrate a process whereby a deregistering handset sends two requests to the base to be deregistered and then deregisters itself. No handshake is required, but the base must receive both messages from the handset in a specified time interval (the second used as a confirmation for the first) before it deregisters the handset from by deleting the stored information in the base.

Figures 12A, 12B:
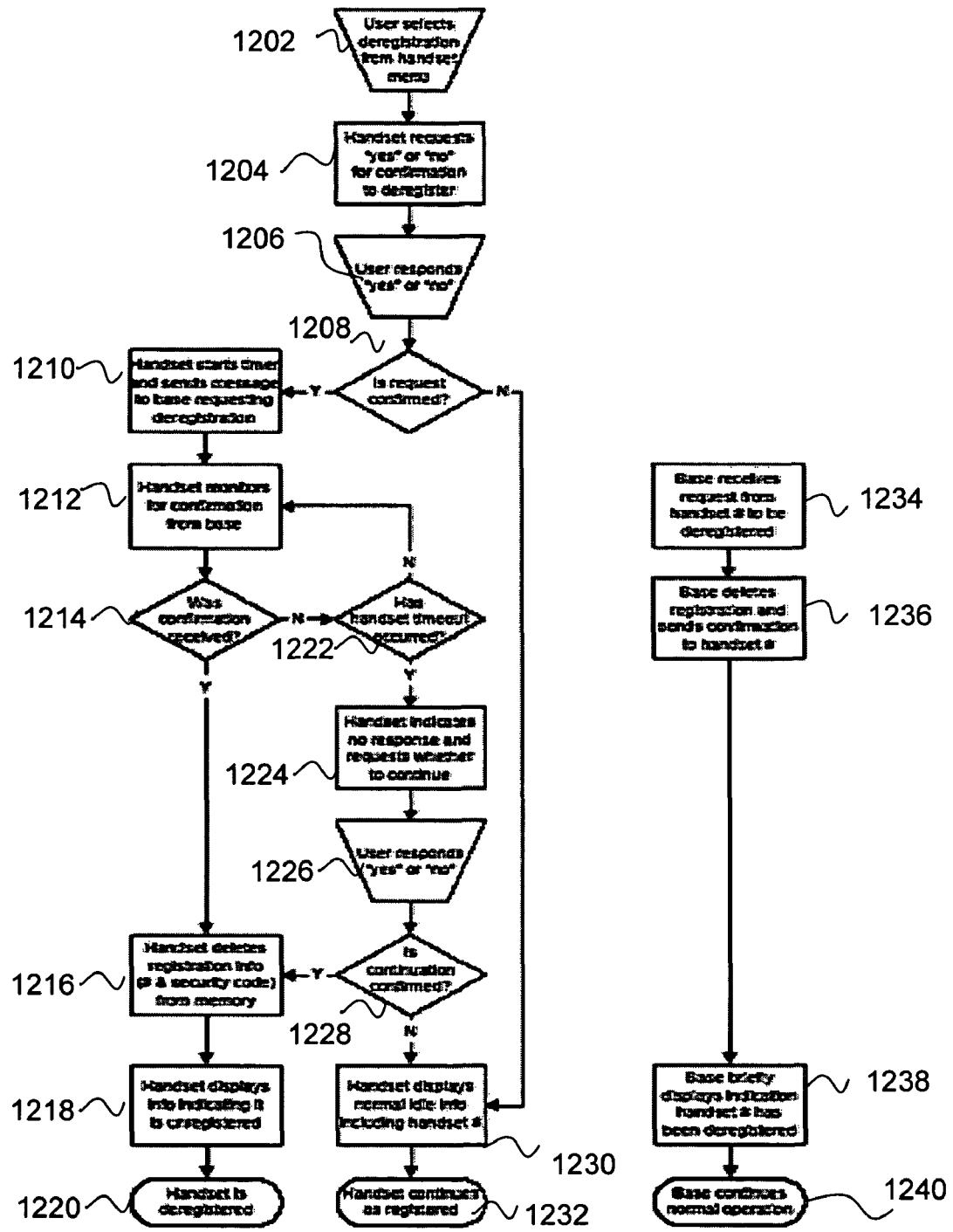
FIGS. 12a and 12b illustrate exemplary steps involved in a method for handset deregistration, as performed at a handset and base unit, respectively, according to another embodiment of the present invention.

Referring now to FIG. 12a, in step 1202, a user selects deregistration from a handset menu.

In step 1204, the handset requests confirmation of the deregistration selection.

In step 1206, the user responds to the confirmation request with a "yes" or "no."

In step 1208, the handset determines whether the deregistration selection is confirmed. If so, the process moves to step 1210. If not, the process moves to step 1230.

In step 1210, the handset starts a timer and sends a message to a base unit requesting that the handset be deregistered.

In step 1212, the handset monitors for a confirmation from the base.

In step 1214, if confirmation is received, the process moves to step 1216.

In step 1216, the handset deletes registration information from its memory.

In step 1218, the handset displays information indicating that it is deregistered.

In step 1220, the handset is in a deregistered state.

If, in step 1214, confirmation is not received, the process moves to step 1222.

In step 1222, if a timeout condition has not been reached for the handset timer, the process returns to step 1212. If a timeout condition has been reached, then the process moves to step 1224.

In step 1224, the handset indicates that no confirmation response has been received and requests whether to continue with the deregistration process.

In step 1226, the user inputs a "yes" or "no" response.

In step 1128, if the response in 1226 indicates that deregistration is to continue, the process moves to step 1216.

If, in step 1228, the response in 1226 does not confirm that deregistration is to continue, then the process moves to step 1230.

In step 1230, the handset displays normal idle information including its handset number.

In step 1232, the handset continues in a registered state.

Referring now to FIG. 12*b*, in step 1234, the base receives a request from the handset for the requesting handset to be deregistered.

In step 1236, the base deletes registration information regarding the requesting handset and sends confirmation to the requesting handset.

In step 1238, the base briefly displays an indication that the requesting handset has been deregistered.

In step 1240, the base continues normal operation.

The method depicted in FIGS. 12*a* and 12*b* thus add a 2-way handshake process so that the handset verifies that the base has received a deregistration request message before the handset is deregistered. If receipt of a deregistration request at the base is not confirmed, an opportunity for manual user override to deregister anyway is provided. This method provides for a situation that might occur in a lab or in a repair operation where a base that the requesting handset is registered with may not be available to receive the request.

Referring now to FIG. 13*a*, in step 1302, a user selects deregistration from a handset menu.

In step 1304, the handset requests confirmation of the deregistration selection.

In step 1306, the user responds to the confirmation request with a "yes" or "no."

In step 1308, the handset determines whether the deregistration selection is confirmed. If so, the process moves to step 1310.

In step 1310, the handset sends a message to a base unit requesting that the handset be deregistered.

In step 1312, the handset resends to the base the message to request deregistration at the base two more times at one second intervals.

In step 1314, the handset deletes from memory all registration information.

In step 1316, the handset displays information that indicates that it is deregistered.

In step 1318, the handset is in a deregistered state.

In step 1308, if the request is not confirmed, the process moves to step 1320.

In step 1320, the handset displays normal idle information including its handset number.

In step 1322, the handset continues in a registered state.

Referring now to FIG. 13*b*, in step 1324, the base receives a request from the handset for the requesting handset to be deregistered.

In step 1326, the base deletes registration information regarding the requesting handset.

In step 1328, the base briefly displays an indication that the requesting handset has been deregistered.

In step 1330, the base continues normal operation.

The steps outlined in FIGS. 13*a* and 13*b* thus involve a process in which the handset merely sends a request to deregister a total of three times and then deregisters the registration information in its memory. If the base receives any of the three messages, it also deregisters the handset from its memory. The process outlined in FIGS. 13*a* and 13*b* differs from that illustrated in FIG. 8 in that the handset does send three messages to the base requesting that it be deregistered.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure.

For example, although embodiments disclosed above detailed use of visual input in user interfaces on handsets and base units, embodiments of the present invention work equally well using auditory inputs. For example, an error tone could be generated by a base unit or handset when registration fails, and a confirmation tone generated when registration is successful. Similarly, a specific beep or beep sequence could be generated by a handset to alert a user when an unregistered handset is placed in a charge cradle.

Furthermore, the term "handset" as user herein, refers generally to any wireless device that can register with a communications system that is configured to communicate with a plurality of wireless devices.

In addition, although in embodiments of the present invention described with respect to FIGS. 2-2*d* and 4, a user is alerted that a handset is unregistered by placing of the handset in a current source device, in other embodiments an unregistered handset can alert a user simply by being powered on, sensing a battery current source and displaying a message indicating unregistered status. As long as the handset is within RF communications range, registration can proceed as outlined, for example, in steps 208-232.

Moreover, in other embodiments of the present invention, a new handset need not be configured to provide an "unregistered" signal to a user, A user could simply place a new handset in a charging cradle knowing that the handset is unregistered and proceed to initiate the registration process at a base unit. For example, a message similar to the exemplary messages in FIGS. 2*a*-2*d* could be contained in written instructions provided with the handset.

In addition, the present invention encompasses embodiments in which the number of handset registration slots exceeds the number of communications slots of a wireless system. For example, a TDMA system containing four duplex communications slots that could accommodate simultaneous duplex communications from the base unit to four handsets, could include eight registration slots. Thus, up to eight handsets could be registered with the base unit even though communication with only four could be maintained at a single time.

In addition, in embodiments of the present invention the registration slots can be contained within a handset registration database.

The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for registering an unregistered wireless telephone handset with a wireless telephone base unit configured to communicate with a plurality of wireless telephone handsets, comprising:
   detecting a current source by the unregistered wireless telephone handset; and
   presenting a registration required indication with the unregistered wireless telephone handset in response to the detected current source, the registration required indication comprising one or more messages presented on a display of the unregistered wireless telephone handset, the one or more messages instructing a user to perform a specified operation at the base station that initiates a registration process of the wireless telephone base unit;
   monitoring for receipt of a registration signal at the unregistered wireless telephone handset from the wireless telephone base unit;
   sending an acknowledgment message containing an ID from the wireless telephone handset over an air interface if the registration signal is received; and
   receiving a registration authorization signal in response to the acknowledgment message.

2. The method of claim 1, wherein detecting the current source comprises one of detecting charge from a charging cradle and detecting current from a battery source in the unregistered wireless telephone handset.

3. The method of claim 1, further comprising:
   setting a first timer in the unregistered wireless telephone handset;
   determining whether the first timer has expired; and
   maintaining an unregistered state at the unregistered wireless telephone handset if the first timer has expired without receipt of the registration signal.

4. The method of claim 1, further comprising:
   setting a second timer in the unregistered wireless telephone handset if a registration signal is received;
   monitoring for the registration authorization signal;
   determining whether the second timer has expired; and
   maintaining an unregistered state at the unregistered wireless telephone handset if the second timer has expired without receipt of the registration authorization signal containing the ID.

5. The method of claim 1, wherein the registration required indication comprises a device indicator associated with an available registration slot of the wireless telephone base unit, wherein the acknowledgment message includes an ID of the unregistered wireless telephone handset, and wherein the registration authorization signal comprises a security code.

6. The method of claim 1, wherein the registration required indication provides instructions to a user of the unregistered wireless telephone handset for initiation of the registration signal at a base unit of the wireless communications system.

7. The method of claim 6, wherein the initiation of registration signal comprises one of selecting from a menu provided in the wireless telephone base unit and depressing a button provided in the wireless telephone base unit.

8. The method of claim 1, further comprising:
   updating a memory in the unregistered wireless telephone handset with a security code and device number; and
   displaying the device number and an indication of successful registration.

9. The method of claim 3, further comprising:
   maintaining an unregistered state if the registration signal is not received;
   detecting disengagement from the current source;
   detecting reengagement with the current source;
   re-starting the first timer; and
   monitoring for receipt of the registration signal at the unregistered wireless telephone handset from the wireless telephone base unit.

10. A method for registering a wireless device with a wireless communications system, comprising:
    receiving a registration request through a user interface at a base unit;
    checking whether a registration slot is available in the wireless communications system;
    broadcasting a registration signal from an air interface of the base unit if a registration slot is available, the registration signal comprising a device indicator associated with an available registration slot of the communication system;
    receiving, over the air interface at the base unit, an acknowledgment signal containing an identifier for an unregistered wireless device in response to the broadcast of the registration signal; and
    sending, in response to the acknowledgment signal, a registration authorization signal over the air interface, the registration authorization signal comprising the identifier for the unregistered wireless device.

11. The method of claim 10, further comprising:
    starting a base timer;
    monitoring for the acknowledgment signal;
    determining whether the base timer has expired; and
    resuming a normal operation state if the base timer has expired without receipt of the acknowledgement signal.

12. The method of claim 10, further comprising:
    indicating unsuccessful registration if the base timer has expired without receipt of the acknowledgment signal; and
    indicating successful registration if the acknowledgment signal is received before the base timer expires.

13. The method of claim 10, further comprising:
    updating internal wireless device registration data after the sending the registration authorization; and
    displaying an indication of successful registration.

14. The method of claim 10, wherein the registration authorization signal further comprises a security code.

15. A system for registering a wireless device with a wireless communications system, comprising:
    a base unit;
    a processor in the wireless device configured to check a registration condition of the wireless device with respect to the wireless communications system, to generate a signal indicating an unregistered status of the wireless device, to cause the wireless device to present a registration required indication instructing a user to perform a specified operation at the base unit that initiates a registration process of the base unit, and to generate an acknowledgment signal identifying the wireless device in response to receipt of a registration signal; and a memory in the wireless device configured to store a security code and wireless device unit indicator;

wherein the base unit comprises a user interface configured to receive locally the specified operation by a user, and a plurality of wireless device registration slots, wherein the base unit is configured to determine availability of one or more registrations slots for wireless device registration, to prevent a broadcast of the registration signal to wireless devices located within a broadcast area if no wireless device registration slot is available, to identify the acknowledgement signal as coming from the unregistered wireless device, and to send an authorization signal in response to the acknowledgment signal, wherein the wireless device is configured to set a first timer when generating a registration request signal, the acknowledgment comprises a temporary ID provided by an ID generator, and the wireless device is configured to set a second timer when the acknowledgment is sent, wherein the wireless device is configured to suspend a registration process if the first timer expires before receipt of the registration signal, and configured to suspend the registration process if the second timer expires before receipt of the authorization signal.

16. The system of claim 15, wherein the wireless communications system comprises a cordless telephone system.

17. The system of claim 15, further comprising a charging cradle, wherein the wireless device is configured to detect the registration condition in response to one of being placed in the charging cradle and being powered on.

18. The system of claim 15, wherein the base unit comprises a wireless device registration database comprising wireless device ID information associated with each registration slot that is allocated to a registered wireless device, and a wireless device nickname associated with each registration slot.

19. The system of claim 18, wherein the wireless communications system comprises a TDMA system and the wireless device comprises a cordless telephone.

20. The system of claim 19, wherein the TDMA system includes a first plurality of communications slots, the first plurality of communications slots being less than or equal in number to the plurality of registration slots.

21. The system of claim 15, wherein the user interface of the base unit comprises one or more of a button, a display, and a user-selectable menu.

* * * * *